ASSOCIATIVE MEMORY ELEMENTS USING FIELD-EFFECT TRANSISTORS

Filed Dec. 19, 1966 2 Sheets-Sheet 1

INVENTOR.
RYO IGARASHI
BY
OSTROLENK, FABER, GERB & SOFFEN
ATTORNEYS

INVENTOR.
RYO IGARASHI
BY
OSTROLENK, FABER, GERB & SOFFEN
ATTORNEYS

United States Patent Office 3,490,007

Patented Jan. 13, 1970

3,490,007

ASSOCIATIVE MEMORY ELEMENTS USING FIELD-EFFECT TRANSISTORS

Ryo Igarashi, Tokyo, Japan, assignor to Nippon Electric Company Limited, Tokyo, Japan Filed Dec. 19, 1966, Ser. No. 602,726
Claims priority, application Japan, Dec. 24, 1965, 40/79,741
Int. Cl. G11c *5/02, 15/00*
U.S. Cl. 340—173 4 Claims

ABSTRACT OF THE DISCLOSURE

The instant invention discloses a novel memory element for use in matrix type memories and the like wherein all of the conventional operations are provided. For example, each memory element is capable of permanently storing either a binary ZERO or a binary ONE condition which state is performed during a write-in operation. Non-destructive readout may be performed by gating the word-line input terminal of the memory element into the conducting state to sense the condition of either one or both of the memory element digit lines to non-destructively determine the content of the memory element. An additional novel feature of the associative memory element is the ability to interrogate the memory element on a non-destructive basis through the application of key information derived from an external source to determine whether a comparison or a mis-match as between the key information and the information stored in the memory element are of the same or of opposite states. This operation is performed on a non-destructive basis and the contents of the memory element are in no way affected by the performance of an interrogation operation.

The instant invention relates to associative memory elements of the type employing field-effect transistors, i.e., memory elements capable of performing interrogation of the memory contents stored therein as against key information derived from an external source, and more particularly to novel associative memory structures capable of non-destructively interrogating the stored data with said key information.

One of the principal objectives for memory devices comprises of associative memory elements is that of comparing stored data with key information derived from an external source in order to select those words matching the key information which may, for example, be derived for an electronic computer control unit. In order to derive this objective from conventional memories, it is necessary to employ a significantly greater amount of sense amplifiers than would be required for ordinary random access memories which do not exhibit such capabilities, such as for example, toroidal core memories. The addition of a significant number of sense amplifiers renders the manufacturing cost of conventional associative memories appreciably expensive when compared with ordinary random access memory devices.

These significant costs are a result of the necessity of installing sense amplifiers together with complex circuitry for amplifying mis-matched signals having inherently small amplitudes and which are delivered from the individual memory elements in an associative matrix of conventional design such as, for example, associative memories employing toroidal cores as the memory elements.

The non-destructive interrogation of associative memory devices employing toroidal cores as memory elements has encountered a great deal of technical difficulties which have been incapable of solution up to the present time and which is one of the major areas of concern by those individuals skilled in this particular field of technology.

The instant invention overcomes all of the technical problems encountered in the conventional associative memory elements by providing a memory element comprised of field-effect transistors which permit non-destructive readout of memory contents as well as non-destructive interrogation of the memory contents wherein the memory state of the memory elements is in no way affected by either readout or interrogate operations.

The memory elements of the instant invention are comprised of a pair of cross-coupled field-effect transistors capable of being maintained indefinitely in either one of two stable states thereby permitting the storage of either a binary ZERO or a binary ONE condition. Write-in and/or readout of each memory element is carried out through the addition of a second pair of field-effect transistors coupled to the bistable circuit so as to permit write-in of a binary ZERO or a binary ONE state, as well as permitting non-destructive readout of the memory contents.

The additional feature of a non-destructive interrogate operation may be carried out by providing a third pair of field-effect transistors coupled to the bistable circuit each of which is provided with an interrogate line and are connected in common to a word-sense line. Interrogation of a memory element by key information derived from an external source is performed by application of a voltage level representing the binary state of the associated binary bit of the key information and applying same to either one of the two interrogate lines. In the case of a mis-match, a current is sensed at the common terminal between the third pair of field-effect transistors indicating the binary bit of the key information and the binary bit stored in the memory elements are of two different states. In the case where a match or a valid comparison exists as between the binary bit of the key information and the binary state of the memory element no or zero current appears at the sense terminal.

Whereas the associative memory element of the instant invention may be employed in a variety of applications, one extremely advantageous use is application in a memory matrix comprised of *m* rows and *n* columns wherein each row has associated therewith *n* memory elements forming a word of *n* bit length with a total capacity of *m* words corresponding to the *m* rows provided in the matrix. The matrix of this type is capable of writing in a binary word or words each comprised of a combination of binary ZERO and binary ONE states. Non-destructive readout of a word in memory may be performed by application of a suitable pulse to a selected one of the word lines for readout of all of the binary bits of the word while at the same time maintaining the word in memory. Interrogation of a word may be performed by application of key information derived from an external source to selected ones of the interrogate lines which provide match or mis-match operation simultaneously for all of the words stored in the matrix. It should be noted that interrogation of a memory plane is not limited to interrogating all of the digit positions of the memory plane and as few as one of the digit positions may be interrogated if desired. For example, let it be assumed that all of the words in a memory plane having a binary ONE condition in the *i*th position are to be read out of memory. This operation may be performed by applying the associated binary bit of the key information derived from an external source to the appropriate digit position of memory plane. Those memory elements associated with the *i*th digit position which are in the opposite binary state will generate a current in the interrogate sense line which inhibits readout of the associated binary word. Those memory elements in the *i*th bit position which are in the same binary state fail to generate a current in the interrogate sense output line enabling readout means to read out all of the words stored in memory so the *i*th bit position matches the binary bit of the key information applied to the *i*th digit line. The matching memory words may be read out either singly or simultaneously depending upon the buffer storage capability of the system employing such associative memory devices.

A primary object of the instant invention is to provide novel associative memory elements which permit non-destructive readout and non-destructive interrogation of the memory element.

Another object of the instant invention is to provide novel associative memory elements which employ field-effect transistors in a novel circuit configuration to permit non-destructive readout and non-destructive interrogation of the memory element.

Still another object of the instant invention is to provide novel associative memory elements employing field-effect transistors to permit non-destructive interrogation of the memory elements to enable the use of sense amplifiers of a much simpler circuit construction than that required in conventional associative memories such as those conventional memories employing toroidal cores.

Yet another object of the instant invention is to provide novel associative memory elements capable of generating larger mis-match output signals than those capable of being obtained from conventional magnetic associative memories and having the capability of increasing the signal to noise ratio which, for the purposes of the instant invention, is defined as the ratio of signal strength available at the interrogate sense terminal for the match state compared to that signal strength available at the word sense terminal for the mis-match state.

Still another object of the instant invention is to provide novel associative memory elements capable of generating a mis-match output of a significantly larger signal strength as compared with conventional associative memories to allow a significant increase in the total number of bit positions for each word in the memory as well as a significant increase in the total number of associative words for each memory plane as compared with conventional magnetic associative memories whose size is limited by its more limited performance capabilities.

Still another object of the instant invention is to provide novel associative memory elements capable of generating mis-match signals of a signal strength markedly greater than those capable of being derived in conventional associative memories so as to appreciably lower the standby power in the associative memory elements of the matrix as compared with conventional semi-conductor associative memories.

Still another object of the instant invention is to provide novel associative memory elements advantageously adapted for high-speed operations aided by peripheral circuitry and whose inherent design facilitates batch fabrication of memory elements and memory planes and especially batch fabrication of the integrated circuit category.

These and other objects of the instant invention will become apparent when reading the accompanying description and drawings, in which:

FIGURE 1(*b*) shows an electrical schematic representation of the field-effect transistor of FIGURE 1(*a*).

Figure 4:
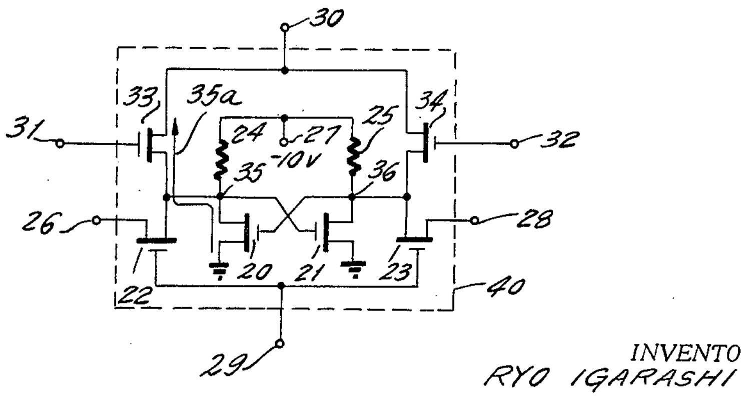
FIGURE 4 is a schematic circuit diagram for a preferred embodiment of associative memory element designed in accordance with the principles of the instant invention.

A typical associative memory element structure designed in accordance with the principles of the instant invention is illustrated in a preferred embodiment of the instant invention as shown in FIGURE 4 and is comprised of a conventional random access memory element configuration consisting generally of a bistable circuit formed of two conventional field-effect transistors and two additional field-effect transistors for write-in and readout as well as another additional pair of field-effect transistors of substantially the same type as those mentioned previously for the purpose of enabling the performance of an interrogate operation.

Figure 1A:
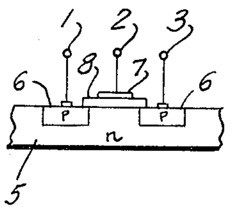
FIGURE 1(*a*) is a schematic cross-sectional view of a field-effect transistor for use in an embodiment of the instant invention.
Figure 1B:
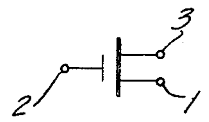

FIGURE 1(*a*) illustrates a cross-sectional view of a typical field-effect transistor for use in an associative memory element of the type shown in FIGURE 4 and which is sometimes referred to as a MOS transistor. It should be understood that the dimensions of the field-effect transistor shown in FIGURE 1(*a*) are not necessarily actual dimensions nor proportions and the figure has been enlarged in size to facilitate an understanding of its design and operation.

Field-effect transistors of the type shown in FIGURE 1(*a*) are typically fabricated by: diffusing boron into an n-type silicon semiconductor substrate 5 to form two p-type regions 6; depositing a silicon oxide film upon the upper surface of substrate 5 so as to bridge the two p-type regions 6; placing an electrode 7 thereon; and mounting lead wires as illustrated for connection to terminals 1, 2 and 3 respectively.

In the structure shown in FIGURE 1(*a*), terminals 1 and 3 are connected to the two symmetrical p-type regions. Accordingly, current is conducted in the substrate 5 in a direction from 1 to 3 by the application of a negative potential on terminal 2, a negative potential on terminal 3 and ground potential on terminal 1. Conversely, current is conducted in the substrate in the direction from 3 to 1 by applying negative potentials to terminals 1 and 2 and connecting terminal 3 to ground or zero volt potential.

MOS transistors with such voltage vs. current characteristics are typically referred to as p-channel normally-off MOS transistors. Since all of the field-effect transistors in the ensuing description in connection with the accompanying drawings are p-channel normally-off MOS transistors, it will be understood that reference to the phrase "field-effect transistor" will identify transistors of the p-channel normally-off MOS type unless otherwise specified. FIGURE 1(*b*) shows the schematic electrical diagram for the MOS transistor of the type shown in FIGURE 1(*a*).

A significant feature of the field-effect transistor is that the impedance, notably its resistive component, across terminals 1 and 3 can be controlled by the magnitude of the potential applied to the terminal 2.

Another important feature of field-effect transistors is that the input impedance looking into terminal 2 is of the order of $10^{11}$ ohms. This is due to the fact that the potential applied to terminal 2 is exerted upon the semiconductor substrate 5 through a silicon oxide film 8 wich is substantially an insulating material. Consequently, power dissipation due to the potential applied to terminal 2 is substantially nullified, and power output is therefore quite high.

Still another feature of field-effect transistors is the adaptability for batch fabrication due to the inherent geometric configuration of the transistor thereby enabling a plurality of such field-effect transistors to be formed upon a single semi-conductor chip or wafer, for example, in accordance with integrated circuit techniques.

Considering the operation of a field-effect transistor, when the negative potential applied to terminal 2 goes more negative than a pre-determined negative voltage level, current flow is initiated between terminals 1 and 3 with the direction of current flow being determined by the relative polarities of the voltage levels at terminals 1 and 3. The terminal 2 to which control signals are applied is commonly referred to as the "gate" of the field-effect transistor.

Figure 2:
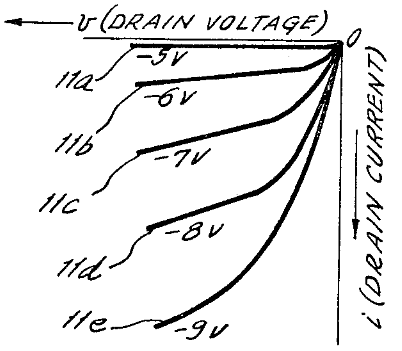
FIGURE 2 is a plot showing a plurality of drain characteristic curves for a field-effect transistor of the type shown in FIGURE 1(*a*).

FIGURE 2 illustrates a family of drain curve for a p-channel normally-off MOS transistor, with drain voltage across terminals 1 and 3 being plotted against drain current flowing between terminals 1 and 3, and with the gate voltage being taken as a parameter. With the field-effect transistor of FIGURE 1(*a*) which may be used in the embodiment of this invention, current commences flowing between terminals 1 and 3 when the gate voltage reaches approximately −5 volts as shown by 11*a*. Current flow between terminals 1 and 3 is increased with decreasing gate voltage as shown by curves 11*a* through 11*e*.

Figure 3:
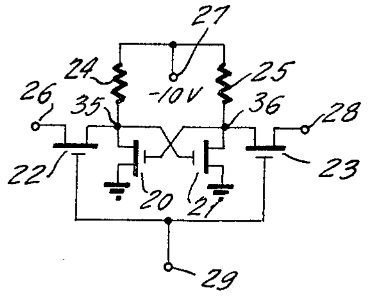
FIGURE 3 is a schematic circuit diagram of a conventional random access type memory element.

FIGURE 3 is a schematic diagram showing a conventional random access memory element utilizing a plurality of field-effect transistors of the type described above. The memory element is basically a bistable circuit which includes a suitable negative DC power source (not shown) maintained at a level of substantially −10 volts and which is connected to terminal 27. A pair of cross-coupled field-effect transistors 20 and 21 are connected through one of their associated terminals and resistors 24 and 25 to terminal 27. The cross-coupling connections are provided between terminals 35 and 36 and the gate of field-effect transistors 20 and 21, hereinafter referred to as FET's. The remaining terminals of the FET's 20 and 21 are grounded. A read and write circuit comprised of two additional FET's 22 and 23 each have one of their terminals coupled to the common points 35 and 36, have their gates coupled to a common terminal 29 and are provided with terminals 26 and 28 which are, together with terminal 29, employed in the read and write operation.

Figure 5:
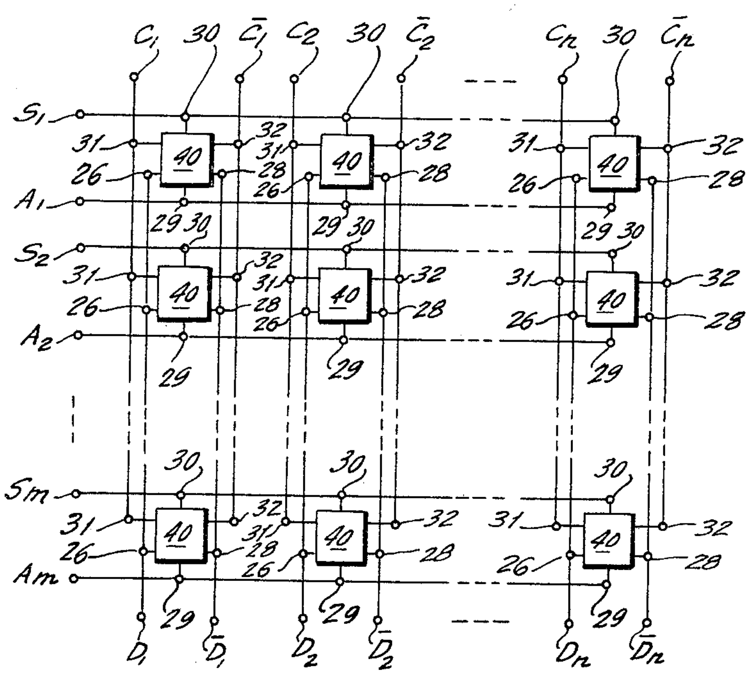
FIGURE 5 is a block diagram showing one application of the instant invention in the form of a memory plane consisting of a plurality of associative memory elements arranged in a regular matrix with each memory element being substantially of the type shown in FIGURE 4.

A known word-arranged type memory device may be realized by arranging memory elements of the type shown in FIGURE 3 in an *m* by *n* matrix or other rectangular array having *m* rows and *n* columns. All of the *n* address columns 29 of the *m* memory cells in each row are coupled to a corresponding address line and *m* pairs of terminals 26 and 28 of the *m* memory cells are connected in each column across an associated pair of digit lines. A detailed view of such a matrix has been omitted here for purposes of clarity but it can be seen, for example, that the memory elements 40 shown in FIGURE 5 may be substituted by the memory elements shown in FIGURE 3 to produce the same matrix as shown in FIGURE 5 except that the terminals 30, 31 and 32 and the lines $C_1$, $\overline{C}_1$ and $S_1$ would be omitted to form such a matrix.

As mentioned above, any one of the memory cells of FIGURE 3 is connected across two digit lines which are complementary to one another. In other words, when a potential corresponding to a binary ONE or binary ZERO is applied to a digit line connected to digit terminal 26 of FIGURE 3 to write either of the two binary information states into the bistable circuit, the other digit line connected to digit terminal 28 remains unused—that is, no potential change is applied to terminal 28, or vice versa. The complementary relations as mentioned above hold true for the readout operation except that no voltage changes are applied at either terminal 26 or 28 in the readout operation in the following manner; readout signals are non-destructively available respectively from the digit lines connected to terminals 26 and 28 in response to the two binary information states of the FET halves of the cross-coupled circuit. It is evident from the foregoing description each of the field-effect transistors 22 and 23 of FIGURE 3 may be used for either writing or readout of the memory element.

Briefly, the operation of the memory element of FIGURE 3 is as follows:

First considering the write-in operation, let it be assumed that FET 20 is "ON" and, consequently, FET 21 is "OFF" and the memory element is in binary ONE state and, conversely, FET 20 is "OFF" and FET 21 is "ON" when the memory element is in the binary ZERO state. Let it now be assumed that it is desired to write or store a binary ONE condition into the memory element.

When the memory element is already in the binary ONE state, the voltage level of terminals 35 and 36 are ground potential or zero volts and −10 volts respectively since FET's 20 and 21 are "ON" and "OFF" respectively. To write a ONE state, a −10 volt level is applied to terminal 29 to gate both FET's 22 and 23 "ON." A 0 volt level is applied to terminal 26 with FET 22 being "ON." This level is applied to terminal 35 and simultaneously therewith to the gate of FET 21. Since FET 21 is already in cut-off state, the 0 volt level simply maintains it in cut-off state. With FET 21 in cut-off, the potential level of 36 remains at −10 volts which is applied to the gate of FET 20 maintaining it in the "ON" state. Thus application of a binary ONE state to the memory element when the memory element is already in the binary ONE state simply acts to maintain the memory element in the ONE state.

Let it now be assumed that a binary ONE is to be loaded into the memory element the time that the memory element is in binary ZERO state. In this state FET's 20 and 21 are "OFF" and "ON" respectively. Terminal 29 receives a −10 volt potential level turning gates 22 and 23 on. A 0 volt potential level is applied at 26 which condition is simultaneously applied to terminal 35 and the gate of FET 21. 0 volt at the gate of 21 turns off 21 establishing a −10 volt level at terminal 36 which is applied to the gate of FET 20 turning this gate on. This establishes a 0 volt level at terminal 35.

Let it now be assumed that a binary ZERO state is to be loaded into memory and that the memory now is in binary ONE state in which FET's 20 and 21 are "ON" and "OFF" respectively.

Terminal 29 receives a −10 volt level turning FET's 22 and 23 "ON." A −10 volt level is applied to terminal 26 which level is thereby simultaneously applied to terminal 35 and the gate of FET 21 turning this gate on which drives the level of terminal 36 to 0 volts which is applied to the gate of FET 20 turning it off. The level at terminal 35 is −10 volts which is applied to the gate of FET 21 maintaining this transistor in the "ON" state. The write-in of a binary ZERO state with the memory element already in binary ZERO state will be obvious from a consideration of the above description.

For readout operation let it be assumed that the memory element is in binary ONE state in which FET's 20 and 21 are "ON" and "OFF" respectively establishing 0 volt and −10 volt levels at terminals 35 and 36 respectively.

A −10 volt level is applied to terminal 29 turning FET's 22 and 23 on. With these FET's turned on, the 0 volt and −10 volt levels available at terminals 35 and 36 will appear at terminals 26 and 28, only one of which need be sensed to determine the memory state of the memory element. Let it be assumed that the voltage level at terminal 26 is sensed. This will indicate that the voltage level at terminal 35 is a 0 volts indicating that the memory element stores a binary ZERO condition. The readout operation is terminated simply by removing the −10 volt level at terminal 29. The application and subsequent removal of the −10 volt level in no way affects the state of the memory element of FIGURE 3 hence providing a non-destructive readout operation, with the memory element retaining the binary ZERO state. The application of the −10 volt level at terminal 29 permits sensing of a −10 volt level at terminal 26 (or conversely the 0 volt level at terminal 28) so as to readily sense the zero state of the memory element. Sensing of the zero state likewise does not affect the memory state of the memory element and provides non-destructive readout in the same way as was previously described.

It can therefore be seen that the memory element of FIGURE 3 provides operation either as an independent element or as one memory element of an ordered matrix depending only upon the needs of the user.

FIGURE 4 illustrates a preferred embodiment of the associative memory element defined in accordance with the principles of the instant invention. The embodiment of FIGURE 4 is basically comprised of the random access memory element structure of FIGURE 3 plus a pair of additional FET's 33 and 34 having gates coupled to terminals 31 and 32 respectively, a second terminal coupled to terminals 35 and 36 respectively, and a third terminal coupled to an interrogate sense terminal 30. FET's 33 and 34 operate as the comparator elements in a manner to be more fully described. The object of providing FET's 33 and 34 is to yield a compare circuit permitting comparison between the key information available from a peripheral circuit or another external source and the memory content stored in the associative memory element.

In other words, when an interrogate signal is applied to either terminal 31 or 32 in response to one binary bit of the key information, the compare circuit initiates comparison between the interrogate signal and the memory contents stored in the bistable circuit basically comprised of resistors 24 and 25 and FET's 20 and 21, so as to deliver a mismatch signal indicative of the result of the compare operation to terminal 30. Each operation of the memory element of FIGURE 4 will be described in more detail here and below.

The resistance values of resistors 24 and 25 and the value of the DC potential applied to terminal 27 are chosen so that FET 21, for example, is turned off or on depending upon whether FET 20 is "ON" or "OFF" respectively. When the FET's 20 and 21 are "ON" and "OFF" respectively, the potential at junction 35 is substantially at 0 volts (i.e., ground potential) and the level at junction 36 becomes substantially equal to the DC potential applied on terminal 27 (i.e., substantially −10 volts).

Strictly speaking, the potential at junction 36 is determined by both the resistance value of resistor 25 and the leakage resistance values of FET's 21, 23 and 34. Therefore, resistor 25 is selected so that the potential at junction 36 may be approximately equal to the DC potential, −10 volts, applied at terminal 27.

Conversely, when transistors 21 and 20 are "ON" and "OFF" respectively, the potential at junctions 35 and 36 are respectively −10 volts and 0 volt (or ground potential).

It will now be assumed in the following description that when junctions 35 and 36 are respectively at 0 volt and −10 volts, the bistable circuit corresponds to the binary ONE state and when these above states are reversed, the bistable circuit corresponds to or stores a binary ZERO state. Initially, the associative memory element of FIGURE 4 is in the following state when unoperated:

The potential levels at word terminal 29 and interrogate terminals 31 and 32 are maintained at 0 volt and the potential levels at digit terminals 26 and 28 and word-sense terminal 30 are maintained at −10 volts. Thus, even though the level terminals 26 and 28 are the same, 0 volt level at terminal 29 prevents FET's 22 and 23 from being turned on so that the memory state of the memory element cannot be changed.

The following describes the behavior of the associative memory element of FIGURE 4:

Let it be assumed that the associative memory element of FIGURE 4 stores a binary ONE state such that FET's 20 and 21 are "ON" and "OFF" respectively. If the potential at terminal 31 is caused to shift from 0 volt to −10 volts under this condition, current is conducted from ground potential through FET 20 and FET 33 toward terminal 30 as shown by arrow **36*a* wherein terminal 30 would normally be coupled to a peripheral circuit during an interrogate operation. Current potential at the opposite terminal 32 is caused to shift from 0 to −10 volts under the same condition, FET 34 sustains its "OFF" state since the potential at terminal 36 is kept constant at −10 volts. Thus, no current will flow into the peripheral circuit from terminal 30 through FET 34, since both terminals of FET 34** are at −10 volts.

Consequently, the memory content of the associative memory element can be detected to be either binary ONE or binary ZERO respectively when no current is available from terminal 30 by applying interrogate signals (of opposite binary rotates) to terminals 32 and 31 simultaneously.

Let it be assumed that signals applied to interrogate terminals 31 and 32 from external circuitry (not shown) be respectively called "0" and "1" interrogate signals. The above-mentioned behavior of the associative memory element may be recapitulated as follows:

A current will flow into terminal 30 only when the memory content stored in the associative memory element and the interrogate signal are mis-matched or non-coincident (i.e., when a "0" interrogate signal is applied when the memory element is in the ONE state or, conversely, when a "1" interrogate signal is applied when the memory element is in the ZERO state). Exhaustive experimentation conducted has demonstrated that the associative memory element in accordance with the instant invention can be designed to have a memory element significantly larger $S/N$ ratio (i.e., the ratio of current available at the word-sense terminal 30 under the match state compared to the current available at the word-sense terminal 30 under the mismatch state) than is available in a conventional associative memory element especially those of the type employing toroidal cores.

In accordance with the foregoing description, it can be seen to be obvious that the behavior of FET's 22 and 23 provide non-destructive interrogation of the stored data through the application of potential changes to interrogate terminal 31 or 32 in response to an interrogate signal. The above description explains the behavior of a single associative memory element as shown in FIGURE 4. The following description sets forth the operation of an associative matrix which employs a plurality of elements of the type shown in FIGURE 4.

FIGURE 5 constitutes one application of the instant invention and illustrates an associative memory plane in which a rectangular array of associative memory elements 40, all of which are substantially similar to that shown in FIGURE 4, is arranged in *m* rows and in *n* columns. In FIGURE 5, the internal structure of each associative memory cell has been omitted for purposes of simplicity. In addition thereto, like reference numerals designate like elements insofar as FIGURES 3, 4 and 5 are concerned, to facilitate the understanding of the associative matrix operation.

As shown in FIGURE 5, all terminals 29 of each distinct row of memory elements 40 are connected to a corresponding one of a group of *m* word lines which, in turn, are respectively connected to end terminals $A_1$ through $A_m$ shown along the left-hand edge of the memory plane. Only three such terminals are shown for purposes of simplicity, it being understood that *m* may represent any real integer. All terminal 30 of the memory elements 40 in each distinct row are coupled to one associated line taken from a group of *m* word-sense line which, in turn, are respectively connected to the terminal $S_1$–$S_m$, which are likewise arranged along the left-hand edge of the memory plane. Again it should be noted that the subscript *m* may represent any real integer.

All terminals 31 of the associative memory elements 40 arranged in a distinct column are connected to one corresponding line taken from a group of *n* ZERO interrogate lines which, in turn, are respectively connected to terminals $C_1$–$C_n$ arranged along the top edge of the memory plane. In a like manner, it should be noted that the total number of columns have been minimized in FIGURE 5 for the purposes of simplicity and that the subscript *n* may again represent any real integer not necessarily equal to the integer represented by the subscript *m*. All terminals 32 of the associative memory elements 40 in each distinct column are connected to one corresponding line taken from a group of *n* ONE interrogate lines which, in turn, are respectively connected to terminals $\overline{C}_1$–$\overline{C}_n$ which terminals are arranged along the top edge of the memory plane.

All of the terminlas 26 of memory elements 40 arranged in a distinct column, are connected to a corresponding one of *n* ONE digid lines which, in turn, are respectively connected to the terminal $D_1$–$D_n$ arranged along the lower edge of the memory plane. All terminals 28 of each distinct column of memory elements 40 are connected to a corresponding one of the *n* ZERO digit lines which, in turn, are coupled to the terminals $\overline{D}_1$–$\overline{D}_n$ with these terminals being arranged along the lower edge of the memory plane.

As has been described, a novel associative memory in accordance with the instant invention can now be realized through the annexation of a comparative function for comparing an interrogate signal with the memory contents of selected memory elements in addition to the presence of all the conventional memory functions of such memory plane. An outstanding operational feature of the new associative memory resides in its capabilities for detecting a word (comprised of *n* memory cells connected to the same word line) which may be matched to interrogate information applied simultaneously to some or all of the interrogate line pairs through the application of external circuitry (not shown).

The operation of the novel associative memory is as follows:

All of the terminals $C_1$–$C_n$ and $\overline{C}_1$–$\overline{C}_n$ are normally maintained at a level 0 volts when the associative memory is unoperated. In addition, all of the word-sense terminals $S_1$–$C_n$ are normally maintained at −10 volts and all of the ONE and ZERO digit line terminals $D_1$–$D_n$ and $\overline{D}_1$–$\overline{D}_n$ are likewise maintained at −10 volts with the memory plane in the unoperated state.

From the above description it can be seen that there are *m* words in the memory plane with each word containing *n* memory elements and hence *n* binary digits. Potentials as some or all of the terminals $C_1$–$\overline{C}_1$ . . . $C_n$–$\overline{C}_n$ are caused to shift from the 0 volt level to the −10 volt level in response to interrogate information from a suitable external source.

Thus the interrogate information is applied either to some or to all of the *n* bits for which interrogation is required. Accordingly, the potentials on remaining ZERO and ONE interrogate lines should be maintained at the 0 volt level when less than all of the *n* bit positions are being interrogated. In response to the interrogate information applied to selected bit positions for which interrogation is required, the potentials on the ZERO interrogate lines are caused to shift, simultaneously by bit, from 0 volts to −10 volts in interrogating a binary ZERO whereas the potentials on the binary ONE interrogate lines are caused to shift, simultaneously by bit, from 0 volts to −10 volts in interrogating a binary ONE.

The potential changes on each pair of ZERO and ONE interrogate lines are applied to the ZERO interrogate line alone in interrogating a binary ZERO and to the binary ONE line alone in interrogating a binary ONE. In no case, should potential changes be made to both the binary ZERO and binary ONE interrogate lines simultaneously or be made to those pairs of interrogate lines for which no interrogation is desired.

As mentioned previously, in the presence of a word for which the interrogate information is matched to the stored data in the corresponding memory elements, no current is applied to the word-sense line connected to the memory elements which correspond to a matched condition.

However, when the interrogate information is mismatched relative to the memory contents in the associative memory elements 40, mis-match signal current or currents are applied from terminal or terminals 30 of memory element or memory elements 40 which has the mis-match condition therein, to the word-sense line connected to the memory elements for the word containing the mis-matched position or positions. Thus, by detecting the absence of a signal current flow in the *m* word-sense lines, it is possible to select that word or those words which are matched to the interrogate information.

Figure 6:
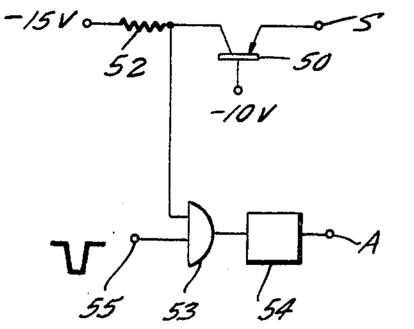
FIGURE 6 is a schematic circuit diagram of a word-sense amplifier and a word driver electrically connected in combination for employment as a peripheral circuit specifically designed for use with the memory plane of the type shown in FIGURE 5.

The word-sense line S and the word line A connected across the memory elements in each row are further connected to peripheral circuitry of the type shown in FIGURE 6 which are each comprised of a word-sense amplifier and a word driver coupled for operation in a manner to be more fully described. In FIGURE 6, the terminals S and A respectively denote the terminals for connecting to the word-sense line and the word line respectively and to such associated lines in the memory plane of FIGURE 5.

In the case where *m* such peripheral circuits of the type shown in FIGURE 6 are connected to the array of associative memory elements of FIGURE 5, no mis-match current output is applied to the emitter electrode of *p-n-p* transistor 50 in each of the peripheral circuits in the rows for which the interrogate information is matched to the memory contents, with the result that the collector potential of the *p-n-p* transistor 50 is maintained at a potential of approximately −15 volts. The −15 volt level is applied to one terminal of "AND" gate 53. A negative clock pulse 56 is applied to remaining terminal 55 of AND gate 53, which pulse is applied in synchronism with the interrogate information so as to enable or open AND gate 53. This negative voltage level is applied to block 54 which represents one row of memory elements 40. More specifically, the negative signal at the output of AND gate 53 is applied to its associated word line A, thereby applying a negative potential, preferably of substantially −10 volts, to each terminal 29 of the associative memory elements coupled to the AND gate through this word line. Non-destructive readout is then effected in the same manner as described with respect to the conventional random access memory element of FIGURE 3, making readout signals available at either of the terminal pairs $D_1$–$\overline{D}_1$, $D_2$–$\overline{D}_2$, . . . $D_n$–$\overline{D}_n$.

For those peripheral circuits shown in FIGURE 6 attached to rows in which the interrogate information is mis-matched to the memory contents, a mis-match current corresponding to the mis-match signal is applied to the emitter electrode of *p-n-p* transistor 50 resulting in a potential drop being developed across resistor 52 so that the potential level at the collector electrodes of transistor 50 increases markedly in the positive direction preferably to the 0 volt level, which level is applied to one input terminal of AND gate 53. This voltage level disables AND gate 53 so that, even though negative pulse 56 is applied to terminal 55 at the AND gate, no negative voltage level appears at the output of the AND gate, thereby maintaining the word drive line 54 (i.e., one of the word drive lines $A_1$–$A_n$) at the 0 volt level. Thus, no readout signals are emitted from the *n* associative memory elements connected to the word line maintained at the 0 volt level so that no mis-matched word will be read from this row or these rows of the memory.

The magnitude of the mis-match signal available from each associative memory element 40 is determined by the mutual conductances of FET's 33 and 34 and the magnitude of the word-select signal voltage applied to the GATE of these FET's. Each of the mutual conductances of FET's 33 and 34 is designed to be approximately 0.5 millimhos thereby yielding a mis-match current having an amplitude as large as 2 milliamperes being applied to the word-sense line. This outstanding feature allows the use of a word-sense amplifier of quite simple construction, such as the resistor 52 and the p-n-p transistor 50 of FIGURE 6.

The above constitutes a detailed description of the readout operation of the associative matrix shown in FIGURE 5 which is characterized by its capability for reading out stored data on the basis of interrogate information applied to the columns of the matrix.

The writing operation of the associative matrix may be performed by the same method as that employed with conventional random access memories or by a method in which the associative readout operation and the writing operation as employed with a random access memory are combined in a manner obvious to those skilled in the art.

Briefly recapitulating the operating phases of the memory plane shown in FIGURE 5:

The writing operation for writing a word in memory, such as for example the word stored in the top-most row of memory elements, is performed by applying a negative 10 volt level to the word line $A_1$ and by applying the suitable levels representative of binary ZERO and binary ONE states to either the digit lines $D_1$–$D_n$ or, if desired, to the digit lines $\overline{D}_1$–$\overline{D}_n$. These operations from the viewpoint of each individual memory element, and their effect, have been described with reference to writing in a memory element of the type shown in FIGURE 3.

Readout of the memory word in the top-most line is performed by applying a negative 10 volt level to the word line terminal $A_1$ and by sensing the condition of the bistable circuit at either the set of terminals $D_1$–$D_n$ or the terminals of $\overline{D}_1$–$\overline{D}_n$.

The interrogation operation is performed by selecting the key word and applying the binary state of each of its digits to selected ones of either the terminals $C_1$–$C_n$ or the terminals $\overline{C}_1$–$\overline{C}_n$. Matching or mis-matching is detected by sensing the state of current flow in each of the word-sense lines $S_1$–$S_m$ with the presence of current in the lines representing a mismatch and the absence of current in the lines representing a match. It should be understood that the application of the key word data bit to either terminals $D_1$–$D_n$ or $\overline{D}_1$–$\overline{D}_n$ yields a simultaneous indication of match or mis-match for all of the words in the memory plane. All words which are mis-matched relative to the key word are inhibited from being read out in the same manner as was previously described. All words which are matched with the key word are read out to a suitable buffer means (not shown) or any other peripheral circuitry. It should be understood that so long as the interrogate lines receive the digital information of the key word, the matched words in the memory plane may be read out sequentially, if desired, simply by maintaining the state of each of the key word digits at terminals $D_1$–$\overline{D}_1$, through $D_n$–$\overline{D}_n$ for a suitable time duration and by sequentially pulsing the AND gates for each of the lines $A_1$–$A_m$ with the negative pulse of the type applied to the terminal 55 shown in FIGURE 6.

It should further be understood that the key word information need not be a word of *n*-bit length for performance of the interrogate operation. For example, it may be desired to read every word out of memory whose first digit position is in the binary ONE state or whose third digit position is in the binary ONE state or whose first three digit positions are in the binary ONE state or any other possible combination which may be less than all of the digit positions. As another example, it may be desired to ascertain what binary words are contained in the memory plane of a value greater than a fixed number. Application of binary states to selected ones of the interrogate lines $C_1$–$C_n$ or $\overline{C}_1$–$\overline{C}_n$ permits this function to be easily and readily performed wherein all such words equal to or greater than this predetermined value will be read out either sequentially or simultaneously or conversely no words at all will be read out if a mis-match occurs for each word in the memory plane. It should again be noted that both readout operations, mainly readout and interrogate, are performed in a non-destructive manner so that all of the memory elements 40 in memory plane retain their binary states, the memory elements being unaffected by either the readout or the interrogate operation.

While the objects of the instant invention have been described hereinabove in connection with a preferred embodiment, it should be understood that the embodiment depicted is only exemplary and various modifications can be made in the circuit construction without departing from the spirit and scope of the instant invention as defined in the appended claims. For example, each of the resistors 24 and 25 in the embodiment of FIGURE 4 may be replaced with a p-channel normally-off MOS transistor while a similar associative memory element with the same functions can be realized by adopting n-channel normally-off MOS transistors which may be substituted for the p-channel normally-off MOS transistor shown in FIGURE 4 with a requisite reversal of polarities of the DC voltage and the signals applied to the respective terminals. It should also be apparent that any type of field-effect transistor may be used in lieu of the p- or n-channel MOS transistor, provided that the field-effect transistor selected has performance characteristics substantially equivalent to those described herein and are adaptable with equal ease for batch fabrication as compared with the p- or n-channel MOS transistor in the manufacture of integrated circuits.

The embodiments of the invention in which an exclusive privilege or property is claimed are defined as follows:

1. A memory element comprising a bistable circuit means comprised of cross-coupled first and second transistors, each having first and second electrodes and a gate terminal and with said first electrode of each being respectively connected to a first and second terminals;

a read-write circuit having third, fourth and fifth terminals and being comprised of third and fourth transistors, each having a first electrode respectively coupled to said third and fourth terminals, a second electrode respectively connected to said first and second terminals, and a gate terminal connected to said fifth terminal;

at least one of said third and fourth terminals adapted to generate a signal representing the state of said bistable circuit means upon application of a signal upon said fifth terminal;

said read-write circuit being adapted to control the state of said bistable circuit means upon application of a sginal representing the binary state to be stored in said memory element upon one of said third and fourth terminals and application of said pulse upon said fifth terminal.

interrogate circuit means having sixth, seventh and eighth terminals and being comprised of fifth and sixth transistors each having a gate terminal respectively connected to said sixth and seventh terminals, a first electrode respectively coupled to said first and second terminals, and a second electrode connected to said eighth terminal;

at least one of said sixth and seventh terminals adapted to receive an interrogate signal representing the binary stae of key information to be compared with that stored in the memory element;

said eighth terminal adapted to generate a signal having a state indicative of a match or mis-match condition between said key information and the stored information of said memory element.

2. The memory element of claim 1 wherein said transistors are of the field-effect type.

3. A memory plane comprising a plurality of memory elements of the type described in claim 1;

said memory elements being arranged in a matrix of *m* rows and *n* columns where *m* and *n* are real integers;

*n* pairs of digit lines arranged in columnar fashion and each being respectively coupled to the third and fourth terminals of the *m* memory elements of the column associated with each digit line;

*m* word lines arranged in row fashion and each being coupled to the fifth terminals of the *n* memory elements of the row associated with each word line.

*n* pairs of interrogate lines arranged in columnar fashion and each being respectively coupled to the sixth and seventh terminals of the *m* memory element of the column associated with each interrogate line;

*m* word-sense lines arranged in row fashion and each being coupled to the eighth terminals of the *n* memory elements of the row associated with each word-sense line.

4. The memory plane of claim 3 wherein word-sense read out circuits are each comprised of a transistor having emitter, base and collector electrodes, and a gate circuit having at least two input and output terminals;

said emitter being coupled to one of said word-sense lines;

said collector being coupled to one input terminal of said gate circuit;

said output terminal of said gate circuit being coupled to an associated word line;

and having one of its input terminals adapted to receive a clock pulse for generating a read and/or write pulse when a memory word matches said key information.

References Cited

UNITED STATES PATENTS

| | | | |
|---|---|---|---|
| 3,031,650 | 4/1962 | Koerner | 340—173 X |
| 3,277,289 | 10/1966 | Buelow | 307—218 X |
| 3,284,782 | 11/1966 | Burns | 340—173 |
| 3,354,440 | 11/1967 | Farber | 340—173 |
| 3,390,382 | 6/1968 | Igarcishi | 340—173 |

TERRELL W. FEARS, Primary Examiner

H. L. BERNSTEIN, Assistant Examiner

U.S. Cl. X.R.

307—238, 291